United States Patent [19]

Shimokawato et al.

[11] Patent Number: 5,325,345
[45] Date of Patent: Jun. 28, 1994

[54] MAGNETO-OPTICAL METHOD AND APPARATUS FOR RECORDING/REPRODUCING DATA

[75] Inventors: Satoshi Shimokawato; Hiromu Miyazawa; Toshiaki Mikoshiba; Hiroshi Ito; Masaya Ishida, all of Suwa, Japan

[73] Assignee: Seiko Epson Corporation, Tokyo, Japan

[21] Appl. No.: 55,795

[22] Filed: Apr. 29, 1993

Related U.S. Application Data

[62] Division of Ser. No. 744,995, Aug. 14, 1991, abandoned.

[30] Foreign Application Priority Data

| | | | |
|---|---|---|---|
| Aug. 17, 1990 | [JP] | Japan | 2-216501 |
| Aug. 17, 1990 | [JP] | Japan | 2-216502 |
| Aug. 17, 1990 | [JP] | Japan | 2-216503 |
| Oct. 16, 1990 | [JP] | Japan | 2-276728 |
| Jul. 26, 1991 | [JP] | Japan | 3-187755 |

[51] Int. Cl.$^5$ .................. G11B 13/04; G11B 11/12; G11B 11/10
[52] U.S. Cl. .................. 369/13; 360/114
[58] Field of Search ............ 369/13; 360/59, 114, 360/66, 60; 365/122

[56] References Cited

U.S. PATENT DOCUMENTS

| | | | |
|---|---|---|---|
| 4,882,718 | 11/1989 | Kryder et al. | 369/13 |
| 4,910,622 | 3/1990 | Saito et al. | 365/122 |

FOREIGN PATENT DOCUMENTS

| | | |
|---|---|---|
| 0061892 | 10/1982 | European Pat. Off. |
| 0104919 | 4/1984 | European Pat. Off. |
| 2-156450 | 6/1990 | Japan ........ 369/13 |
| 03-86954 | 4/1991 | Japan ........ 369/13 |

OTHER PUBLICATIONS

Patent Abstracts of Japan, vol. 13, No. 43 (P-821) Jan. 31, 1989 and JP-A-63 239 638 (Canon Inc.) Oct. 5, 1988.
Patent Abstracts of Japan, vol. 14, No. 201 (P-1041) Apr. 24, 1990 and JP-A-2 042 664 (Matsushita Electric Ind. Co. Ltd.) Feb. 13, 1990.
Patent Abstracts of Japan, vol. 15, No. 266 (P-1223) Jul. 5, 1991 and JP-A-3 086 954 (Mitsubishi Electric Corp.) Apr. 11, 1991.

*Primary Examiner*—Hoa T. Nguyen
*Attorney, Agent, or Firm*—Ladas & Parry

[57] ABSTRACT

When data are thermo-magnetically recorded to a perpendicular magnetized film of a recording medium, it is possible to prevent unnecessary magnetic domains from being formed and unerasable magnetic domains from being produced. The medium 11 is rotated by a motor 12. When being passed through a recording field generated by a magnet 14, the medium 11 is irradiated with a recording beam generated by an optical head 13, so that data can be recorded to a perpendicular magnetized film of the medium 11 as bubble magnetic domains. Further, when the medium 11 passes through a correcting magnetic field generated by a magnet 15 disposed away from the position at which data are recorded, unnecessary and/or unerasable domains can be eliminated.

19 Claims, 11 Drawing Sheets

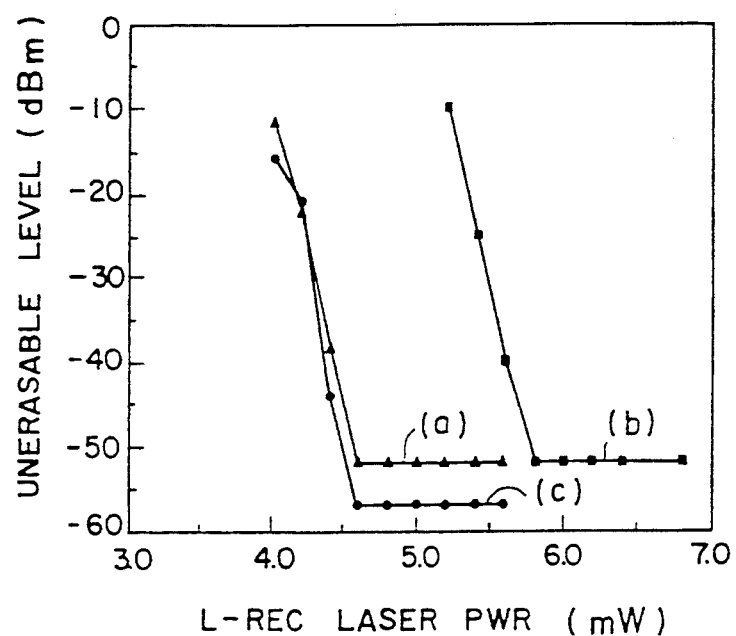
F I G. 15

MAGNETO-OPTICAL METHOD AND APPARATUS FOR RECORDING/REPRODUCING DATA

This is a divisional of copending U.S. application Ser. No. 07/744,995, filed on Aug. 14, 1991, now abandoned.

BACKGROUND OF THE INVENTION

The present invention relates to a method and apparatus for thermo-magnetically recording information data by applying thermal energy of convergent rays (e.g. a laser beam) to a magnetic layer within a magnetic field and/or reproducing the recorded information data on the basis of magneto-optical effect (referred to as magneto-optical recording/reproducing, thereinafter).

Recently, magneto-optical recording technique adopting a perpendicular magnetized film as a recording medium has been widely researched as one of optical rewritable recording methods and has been already put into practical use. In this method, information data are recorded thermo-magnetically. In more detail, an energy beam such as a constant or pulse-modulated laser beam is focused onto a memory layer within a modulated or static magnetic field to heat the memory area, so that switched magnetic domains can be formed in the memory layer according to information data, in dependence upon the magnetic interaction between the memory layer and the external field, to record information data.

In the prior-art recording technique, however, there exists a problem in that switched magnetic domain are erroneously formed or recorded magnetic domains are distorted in shape due to non-uniformity of the recording medium or focusing error, with the result that recording noise is inevitably generated and therefore the reproduced signal quality is deteriorated. Further, in the case of direct overwriting which needs no erasing operation separate from the recording operation, even though former domains are supposedly erased simultaneously with the recording of new domains over the former domains, in practice, vestiges of some of the former domains still remain as they have not been perfectly erased during the recording of the new domains.

SUMMARY OF THE INVENTION

An object of the present invention is to eliminate recording noise caused by unnecessary magnetic domains, such as erroneously formed domains and remaining vestiges of erased domains, and distorted shapes of recorded domains in a magneto-optical recording medium. A particular object of the present invention is the erasure of unnecessary magnetic domains and the correction of distorted shapes of recorded domains by applying a correcting magnetic field to a magneto-optical recording medium after recording data or before reproducing data.

To achieve the above-mentioned object, the present invention provides a magneto-optical method of recording data to a perpendicular magnetized film formed on al recording medium, comprising the steps of: (a) forming bubble magnetic domains in the perpendicular magnetized film by simultaneously applying a recording beam and a recording magnetic field to the recording medium, as recording step; and (b) applying a correcting magnetic field perpendicular to a film surface of the perpendicular magnetized film to the medium after data have been recorded, as correcting step.

Further, the present invention provides a magneto-optical apparatus for recording data to a perpendicular magnetized film formed in a recording medium, comprising: (a) moving means for moving the recording medium; (b) recording means disposed at a predetermined position in a moving course of the recording medium, for applying a recording beam and a recording magnetic field to the recording medium to form bubble magnetic domains in the perpendicular magnetized film as data recording; and (c) correcting means disposed downstream of said recording means along the moving course of the recording medium, for applying a correcting magnetic field to the perpendicular magnetized film in a direction perpendicular to a film surface thereof.

Further, the present invention provides a magneto-optical method of reproducing data recorded in a perpendicular magnetized film formed in a recording medium as bubble magnetic .domains, Comprising the steps of: (a) applying a correcting magnetic field in a direction perpendicular to a film surface of the perpendicular magnetized film, as correcting step; and (b) reading the recorded data on the basis of magneto-optical effect, by simultaneously applying a reproducing beam and a reproducing magnetic field to the recording medium, after the correcting step.

Furthermore, the present invention provides a magneto-optical apparatus for reproducing data recorded in a perpendicular magnetized film formed in a recording medium as bubble magnetic domains, comprising: (a) moving means for moving the recording medium; (b) reproducing means disposed at a predetermined position in a moving course of the recording medium, for applying a reproducing beam and a reproducing magnetic field to the perpendicular magnetized film to read the recorded data on the basis of magneto-optical effect; and (c) correcting means disposed upstream of said reproducing means along the moving course of the recording medium, for applying a correcting magnetic field to the perpendicular magnetized film in a direction perpendicular to a film surface thereof.

The recording method according to the present invention can be realized by a thermo-magnetic recording apparatus such that a mechanism for generating a static magnetic field perpendicular to the surface of a disk-shaped recording medium at a position different from that where recording magnetic domains are formed is additionally provided for the apparatus for recording information data by focusing an energy beam onto a perpendicular magnetized film formed on the recording medium in order to form bubble magnetic domains.

The bubble theory for a perpendicular magnetized film has been studied for a long time for the application of magnetic bubble memory. According to the bubble theory, the minimum radius R of a bubble domain which can exist stably in a perpendicular magnetized film of a single layer can be expressed as, under the conditions that the influence of demagnetizing field can be disregarded and further no external field exists:

$$R = \sigma_B / 2 M_s H_c \qquad (1)$$

where $\sigma_B$ denotes the domain wall energy density; $M_s$ denotes the saturation magnetization; and $H_c$ denotes the wall coercivity.

The above expression (1) indicates that a bubble domain whose radius is smaller than R is collapsed by a compressive force caused by the wall energy and therefore will not exist.

On the other hand, where field $H_s$ perpendicular to the film surface is applied, the minimum stable domain radius R can be expressed as $$R = \sigma_B \{2M_s(H_c - H_s)\} \quad (2)$$

where the sign of the field $H_s$ is defined as positive when being opposite to the magnetization direction of the bubble domain. This expression (2) indicates that it is possible to increase the minimum stable domain radius, as compared with when no magnetic field is applied, as far as the field $H_s$ is selected appropriately within a range smaller than the wall coercivity $H_c$.

The same can be applied to an exchange-coupled multilayer film. In this case, however, it is possible to determine the minimum stable domain radius under consideration of the interface wall energy density $\sigma_W$ between magnetic layers, in addition to the above consideration of a single layer film.

Therefore, in the thermo-magnetic recording such that information data are stored as bubble domains in a perpendicular magnetized film, it is possible to collapse only the switched domains smaller than any given size, by applying a magnetic field $H_s$ with an appropriate intensity after data have been recorded, in both the cases of a single layer film and an exchange-coupled multilayer film.

On the other hand, the distortion in shape of the recorded domains in thermo-magnetic recording is caused when the recording is effected under thermally unbalanced conditions. Under thermally well balanced conditions, the magnetic domain is so formed that the sum total of the wall energy $E_W$, the interaction energy $E_H$ between magnetization and external field, and the demagnetizing field energy $E_M$ may be minimized. In general, therefore, the magnetic domain results in such a shape that the total length of the wall is minimized. Accordingly, it is possible to reform the distorted shape of the recorded domains formed through thermally unbalanced thermo-magnetic recording process into less-distorted shape thereof, by applying an appropriate magnetic field in the direction perpendicular to the film surface after the thermo-magnetic recording has been completed, in order to apply a wall driving force beyond the wall coercivity $H_c$.

Such a concept that the imperfection of data recording can be corrected by applying a magnetic field with an appropriate intensity to the medium after data have been recorded as described above is quite a novel concept. On the basis of the above-mentioned novel concept, in the apparatus according to the present invention, a magnetic field is applied in the direction perpendicular to a recording medium at a position different from that of an optical head, in order to control switched magnetic domains at which data are stored, between after information data have been recorded by the ordinary thermo-magnetic recording method and before the recorded data are reproduced (e.g. when a disk-shaped rotating recording medium has rotated once after data recording).

BRIEF DESCRIPTION OF THE DRAWINGS

FIG. 15 is a graphical representation showing the evaluation test results of the sixth embodiment.

DETAILED DESCRIPTION OF THE PREFERRED EMBODIMENTS

Embodiments of the present invention will be described thereinbelow with reference to the attached drawings.

1st Embodiment

Figure 1:
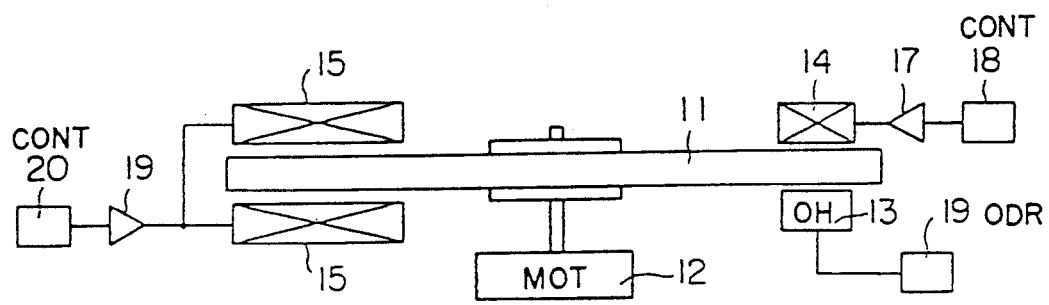
FIG. 1 is a block diagram showing first and second embodiments of the recording/reproducing apparatus according to the present invention.

FIG. 1 shows a first embodiment of the thermo-magnetic recording apparatus according to the present invention. In FIG. 1, a disk-shaped magneto-optical recording medium 11 is rotated by a rotating mechanism 12 such as a motor. The medium 11 is formed with a perpendicular magnetized single layer film as a memory layer. This memory layer is previously magnetized in a predetermined direction for each track. When being passed through a recording magnetic field generated by an electromagnet 14, the medium 11 is irradiated with a focused recording beam generated by an optical head 13 provided with a light source of semiconductor laser and disposed so as to opposed to the electromagnet 14 by sandwiching the medium 14 therebetween, in order that data are recorded thermo-magnetically in the memory layer of the medium 11. The electromagnet 14 is energized by a driver 17 and the intensity of the recording field is controlled to a constant value by a control circuit 18. The optical head 13 is driven by an optical head driver 19 in such a way that the intensity of the recording light is modulated to high level or low level according to data. Therefore, magnetic domains (recorded domains) can be formed in the memory layer to store data.

Immediately after data have been recorded, the medium 14 passes through a correcting magnetic field generated by another electromagnet 15 disposed so as to sandwich the medium 11 at a position away from the optical head 13. The electromagnet 15 is energized by another driver 19 and the intensity of the correcting field is controlled to a constant value by another control circuit 20. The; direction of the correcting magnetic field is perpendicular to the film surface of the memory layer (the disk surface of the medium 11). Further, the direction of the correcting field is determined in the direction the same as or opposite to the magnetization direction of the recorded domains. The distorted shape of the recorded domains can be corrected by applying the above-mentioned correcting magnetic field.

To reproduce data recorded in the medium 11, the medium 11 is rotated and irradiated with a reproducing beam generated by the optical head 13 when passing through a reproducing magnetic field generated by the electromagnet 14, to read data from the medium 11 on the basis of magneto-optical effect.

The intensity of the reproducing magnetic field is controlled by the control circuit 18, and that of the reproducing beam is controlled by the optical head driver 19.

The electromagnet 14 for generating the recording-/reproducing magnetic fields can be replaced with a reversible permanent magnet.

The inventors tested the above-mentioned apparatus under the following conditions: To record data, the relative speed between the disk surface of the medium 11 and a laser spot of the recording beam was 5.6 m/sec; the modulation (recording) frequency of the recording beam was 3.7 MHz; the pulse width of the recording beam was 60 nsec; the intensity of the pulse beam was 6.0 mW; and the intensity of the recording field was 250 Oe. TO reproduce data, a correcting field of 4000 Oe was applied in the direction the same as the magnetization direction of the recorded domains, and a continuous laser beam of 1.0 mW was irradiated upon the medium. The test results were as follows: the carrier level in power spectrum of the reproduced signal was $-2.5$ dBm at the recording frequency, and the noise level in the vicinity of the recording frequency was $-53.3$ dBm. These indicated that data were reproduced excellently.

For comparison, on the other hand, data were reproduced without applying the correcting field after data had been recorded under the same conditions. The carrier level was $-2.4$ dBm, which indicated that there were no big difference between the two. However, the noise level was $-50.1$ dBm, which was about 3 dB higher than that of the embodiment of the present invention. As described above, according to the present invention, it is possible to reduce the recording noise as compared with the prior-art method or apparatus. Further, the similar results were obtained in the case where the correcting field was applied in the direction opposite to the magnetization direction of the recorded domains.

2nd Embodiment

In this embodiment, the present invention is applied to a direct overwrite method as disclosed in Japanese Published Unexamined (Kokai) Pat. Appli. No. 1-125747. The apparatus of this embodiment is basically the same in construction as the first embodiment shown in FIG. 1.

Figure 2:
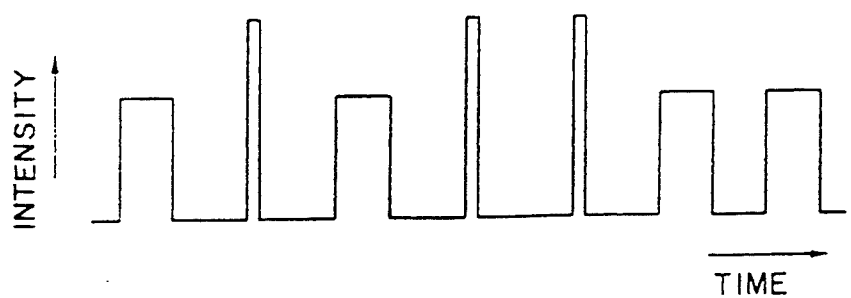
FIG. 2 is a waveform ;diagram showing the intensity of a modulated recording beam in the second embodiment.

In FIG. 1, the recording magnetic field generated by the electromagnet 14 is controlled so that the intensity thereof is kept at a constant level. However, the recording beam generated by the optical head 13 is modulated in such a way that recording pulses each having a relatively wide width and a relatively low energy density and erasing pulses each having a relatively narrow width and a relatively high energy density are combined each other as shown in FIG. 2. The recording pulse corresponds to "1" or "0" of a digital data, and the erasing pulse corresponds to "0" or "1" of the digital data. As an example of the modulation methods, the modulation is effected in synchronism with a channel clock generated by clock pits previously formed in the recording medium 11. That is, the recording and erasing pulses are irradiated upon the recording medium at such a timing as to match the recorded domains previously formed in the medium 11. Therefore, the direct overwrite can be realized in such a way that newly recorded domains are formed at positions upon which the recording pulse is irradiated and previously recorded domains are erased at positions upon which the erasing pulse is irradiated.

After the above-mentioned direct overwrite has been completed, the medium 11 is passed through the correcting field generated by the electromagnet 15. The direction of the correcting field is opposite to the magnetization direction of the recorded domains.

The recorded data can be reproduced by the ordinary method in accordance with the magneto-optical effect in the same way as in the first embodiment.

The electromagnet 14 for generating the recording-/reproducing magnetic fields can be replaced with a fixed or reversible permanent magnet.

The effect of the correcting field in this embodiment will be described in further detail hereinbelow.

The afore-mentioned Japanese (Kokai) Pat. Appli. No. 1-125747 discloses that direct overwrite can be perfectly realized by selecting various conditions of the magnetic medium, erasing pulse, recording field, etc. so that a radius of the magnetic domain formed when an erasing pulse is irradiated become smaller than the minimum stable domain radius r determined by the afore-mentioned expression (1). However, in the case of a rare earth-transition metal based alloy thin film widely used as the memory layer, since the minimum stable domain radius R is about 0.05 $\mu$m, it is practically impossible to form such a small domain as R=0.05 $\mu$m or less by only adjusting the erasing pulse conditions, under such a strong recording magnetic field that sufficiently large recording domains can be formed by the irradiation of the recording pulses. Therefore, there exists a problem in that small domains formed by the irradiation of the erasing pulses remain as recorded .noise without being erased (referred to as unerasable domains).

In this embodiment, however, when a correcting field $H_e$ is applied to the medium having unerasable domains in the direction opposite to the magnetization direction of the recorded domains, that is, opposite to the unerasable domains, the minimum stable domain radius R can be determined by the afore-mentioned expression (2). This expression (2) indicates that it is possible to make the minimum stable domain radius R larger than that obtained under non-magnetic field condition, by appropriately selecting the correcting field $H_e$ in a range smaller than the coercivity $H_c$. Therefore, it is possible to erase only the unerasable domains by an external field under the conditions that the domain radius formed by the recording pulse is larger than the minimum stable domain radius R determined by the expression (2) and further the domain radius formed by the erasing pulse is smaller than the same R. Further, in order to make sufficiently large the above-mentioned domain radius ratio by the recording pulse to that by the erasing pulse, it is effective to use an optical pulse including erase pulses each having a pulse width narrower and an energy density higher than those of the recording pulse, as shown in FIG. 2.

Here, the practical values of the pulse widths and the energy densities (intensities) of the recording and erasing pulses differ according to the composition and construction of the recording medium film or the rotational speed of the recording medium. Further, the intensities of the recording-and correcting fields differ according to the cases. However, it is preferable from the practical standpoint that the recording field is about 100 to 600 Oe and the correcting field is about 3000 to 6000 Oe.

In this embodiment, rare earth-transition metal amorphous film such as TbFeCo, DyFeCo, NdDyFeCo, etc. or perpendicular magnetized film such as noble metal cobalt based (e.g. Co/Pt) composition .modulated periodic multilayer film can be used as the memory layer of the recording medium.

Figure 3:
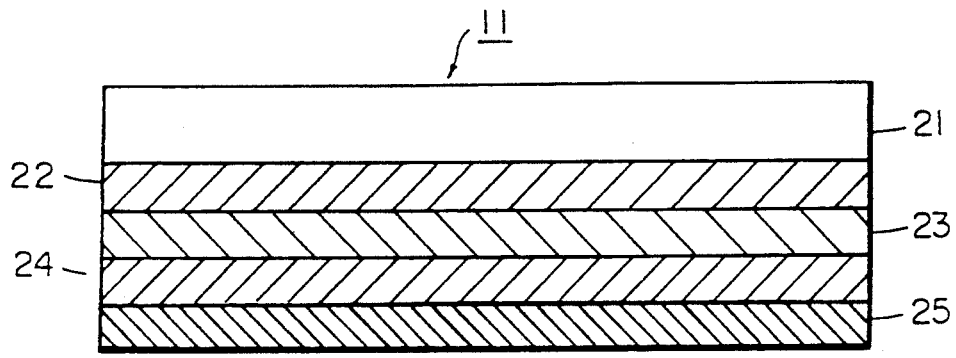
FIG. 3 is a cross-sectional view showing a structure of a medium used for the evaluation test in the second embodiment.

For evaluation test of the present embodiment, a medium 11 as shown in FIG. 3 was prepared. The medium 11 was formed by laminating a 80 nm-thick $Si_3N_4$ film 22, a 90 nm-thick TbFeCo film (memory layer) 23 and a 80 nm-thick $Si_3N_4$ film 24 in sequence on a 90 mm-dia. polycarbonate substrate 21 and by coating a protective layer 25 of ultraviolet light hardened resin thereon.

By use of this recording medium 11 and the apparatus shown in FIG. 1, digital data were recorded in accordance with optical modulation method under the conditions that the rotational speed of the medium was 1800 r.p.m; the recording field intensity was 200 Oe; and the correcting field intensity was 5000 Oe. Since the memory layer 23 of the medium 11 was a so-called rare earth rich film such that the sub-lattice magnetization of rare earth elements is dominant at room temperature and further a compensation point is located between room temperature and the Curie temperature, the direction of the recording field was determined the same as that of the correcting field. Further, the recording beam was modulated in such a way that the laser output of each erasing pulse was 14 mW; the pulse width thereof was 20 nsec; the laser output of each recording pulse was 8 mW; and the pulse width thereof was 90 nsec.

Under the above-mentioned conditions, a random pattern digital-modulated to 4/11 code was written in the recording medium, and then the same 4/11 code random pattern was overwritten. The byte error rate of the reproduced signal was measured as $6 \times 10^{-6}$. This value indicates that direct overwrite was achieved excellently, because the measured results were the same in level as errors caused by medium noise or medium defects. On the other hand, for comparison the prior-art recording method was effected without use of any correcting magnetic field, and the similar evaluation test was made. The observed overwrite error probably caused by unerasable domains was about $3 \times 10^{-3}$.

The magnetic domains of the medium recorded in accordance with the invention method and the magnetic domains of that recorded in accordance with the prior-art method were observed by use of a polarizing microscope. In the invention method, no switched domains were observed except recording domains formed intentionally. In the prior-art method, however, about 0.2 μm dia. switched domains considered as unerasable domains were observed between the intentionally formed recorded domains.

3rd Embodiment

Figure 4:
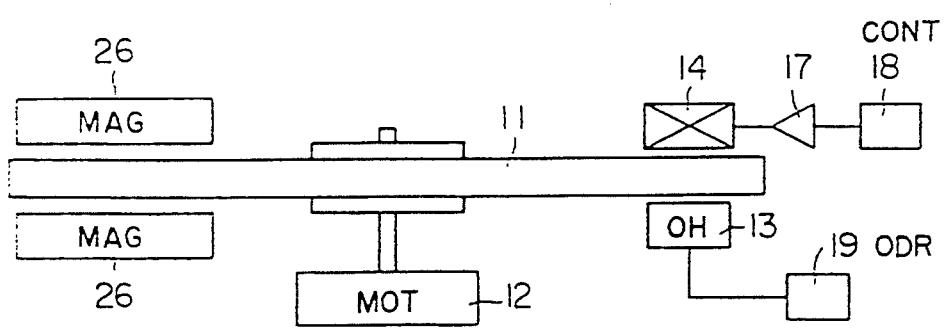
FIG. 4 is a block diagram showing a third embodiment obtained by modifying the first or second embodiment.

In the first and second embodiments shown in FIG. 1, it is also possible to replace the electromagnet 15 for generating the correcting field with a permanent magnet. FIG. 4 shows an apparatus modified as described above. In this third embodiment, the correcting field is applied in the direction perpendicular to the disk surface of the medium 11 by a permanent magnet 26 disposed so as to sandwich the medium 11. Further, the other electromagnet 14 can be replaced with a fixed or reversible permanent magnet.

4th Embodiment

Figure 5:
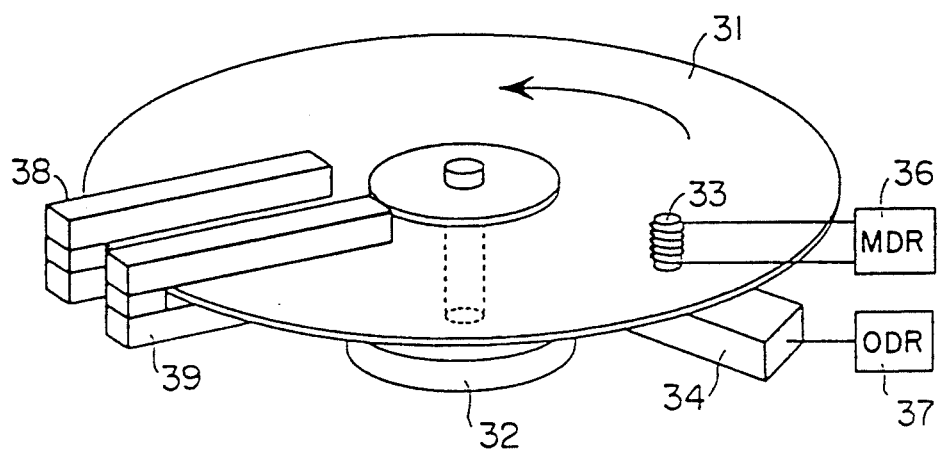
FIG. 5 is a perspective view showing the construction of a fourth embodiment.

FIG. 5 shows a fourth embodiment of the apparatus of the present invention. In this embodiment, data are recorded to the medium 31 by irradiating a recording beam of a constant intensity upon the medium within the recording field whose intensity is modulated according to data. This method is of a kind of direct overwrite.

The medium 31 is a disk formed with a single layer perpendicular magnetized film as the memory layer. The medium 31 rotated by a rotating mechanism 32 is irradiated with a focused recording beam emitted from an optical head 34 when passing through a modulated recording field generated by a magnetic head 33, so that data can be recorded on the medium. The magnetic head 33 is controlled by a magnetic head driver 36 in such a way that the intensity and the direction of the recording field can be varied according to data to be recorded. That is, the recording field is modulated to a combination of positive square pulses and negative square pulses. The optical head 34 is controlled by an optical driver 37 so that the intensity of the recording beam can be kept constant. Therefore, recording domains magnetized mutually in the opposite directions can be formed on the memory layer of the medium 31 in accordance with the modulated directions of the recording field.

Immediately after recording, the recorded domains of the medium 31 are passed in sequence through first and second correcting fields generated by two permanent magnets 38 and 39, respectively both located away from the optical head 34. The directions of these first and second correcting fields are both perpendicular to the disk surface of the medium 31 or the film surface of the memory layer but mutually opposite to each other.

The major effect of these correcting fields is to erase the preceding recorded domains which remain unerasably (i.e. unerasable domains) in direct overwrite. Since there are two opposite magnetization directions in the recorded domains, in this embodiment the first and second correcting fields are applied to the medium in the two mutually opposite directions. However, it is also possible to expect the effect of the correcting field to some extent, even if only one correcting field is applied. Further, the permanent magnets 38 and 39 can be replaced with two electromagnets.

In this embodiment, recorded data can be reproduced by the ordinary method utilizing the magneto-optical effect.

The evaluation test of this embodiment was made under the following conditions: To record data, the relative speed between the disk surface of the medium 11 and a laser spot of the recording beam was 5.6 m/sec; the intensity of the recording laser beam was 8.0 mW; and the intensity of the recording field modulated by 2.0 MHz or 3.7 MHz was 200 Oe. The two recording fields modulated by two different frequencies were applied alternately to the medium. To reproduce data, the intensity of the reproducing laser beam was 1.0 mW. Further, the intensity of the first and second correcting fields were both 3000 Oe, and the above-mentioned test was repeated at different temperatures. The test results indicated that unerasable domains were not at all observed.

On the other hand, for comparison the similar evaluation test was made without applying the first and second correcting fields. In this test, noise components were observed in the reproduced signal, when data were overwritten at a relatively low temperature to the domains at which data had been previously recorded at a high ambient temperature. The above noise may be generated due to unerasable portions remaining at side peripheral portions of the previously recorded domains.

5th Embodiment

Figure 6:
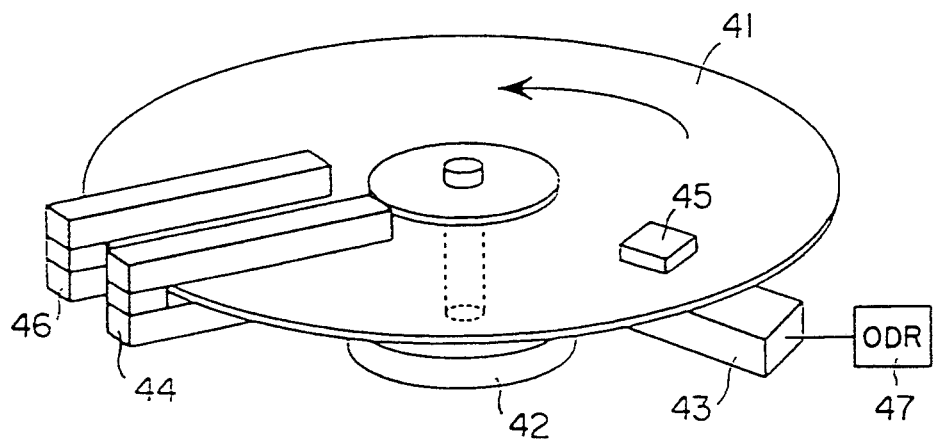
FIG. 6 is a perspective view showing the construction of a fifth embodiment.

In this embodiment, the present invention is applied to an optical modulation overwrite method (a kind of direct overwrite method) by use of a recording medium formed of an exchange-coupled multilayer magnetic film, as disclosed in Japanese Published Unexamined (Kokai) Pat. Appli. No. 62-175948. FIG. 6 shows the apparatus construction of this embodiment.

In FIG. 6, a disk-shaped medium 41 formed with guide grooves for tracking servomechanism is rotated by a rotating mechanism 42 such as a motor. Along the rotational (arrow) direction, there are arranged in sequence a permanent magnet 46 for generating a correcting field, a permanent magnet 44 for generating an initializing field, and an optical head 43 driven by an optical head driver 47. Further, a permanent magnet 45 for generating a recording/reproducing field is disposed so as to be opposed to the Optical head 43 by sandwiching the medium 41 between the two. Therefore, when rotated, the medium 41 is repeatedly passed in sequence through the correcting field generated by the permanent magnet 46, the initializing field generated by the permanent magnet 44, and the recording/reproducing field generated by the permanent magnet 45. The directions of the correcting field, the initializing field and the recording/reproducing field are perpendicular to the disk surface of the medium 41. However, the direction of the correcting field is opposite to that of the initializing field.

In data recording operation, when the medium 41 is being passed through the recording/reproducing field generated by the magnet 45, a recording laser beam whose intensity is modulated to "low" or "high" level according to data to be recorded is irradiated upon the medium 41 through the optical head 43.

In data reproducing operation, when the medium 41 is being passed through the recording/reproducing field generated by the magnet 45, a reproducing laser beam whose intensity is kept constant is irradiated upon the medium 41 through the optical head 43, to read data from the medium 41 by the optical head 43 on the basis of the magneto-optical effect.

Further, in this embodiment, the permanent magnets 44, 45 and 46 can be replaced with electromagnets, respectively.

The principle of direct overwrite in this embodiment will be described hereinbelow.

The recording medium 41 includes an exchange coupled double layer film composed of a first magnetic layer (referred to as memory layer) and a second magnetic layer (referred to as reference layer) mutually exchange-coupled to each other at room temperature. The memory layer has a relatively large coercivity at room temperature and a relatively low Curie point. On the other hand, the reference layer has a relatively small coercivity at room temperature and a high Curie point.

First, the initializing field of an appropriate intensity is applied to the medium to arrange only the magnetization direction of the reference layer in a predetermined direction without changing the magnetization direction of the memory layer. Thereafter, the recording field of an appropriate intensity is applied to the medium and simultaneously the laser beam is irradiated thereupon. In recording laser beam irradiation, a low-level laser beam for generating a relatively low medium temperature (referred to as L recording) and a high-level laser beam for generating a relatively high medium temperature (referred to as H recording) are selectively irradiated upon the medium according to data to be recorded. In the L recording, the magnetization direction of the reference layer does not change, and the magnetization of the memory layer drops relative to that of the reference layer in exchange-coupled energy. In the H recording, the magnetization direction of the reference layer is switched by the recording field, and also the magnetization of the memory layer drops relative to that of the reference layer in exchange-coupled energy. As a result, data can be recorded as change in the magnetization direction of the memory layer.

When the initializing field is applied again, the magnetization direction of only the reference layer is arranged in one direction.

As a result of in-depth study of this direct overwrite method, it was found that there exist unerasable magnetic domains in the L recording.

Figure 7A:
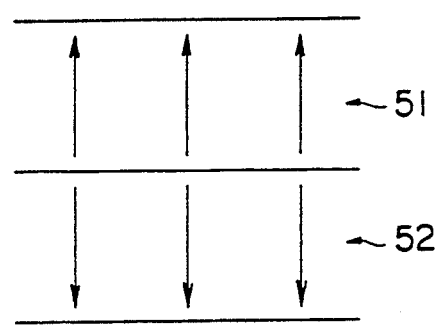
FIGS. 7(a), (b) and (c) are illustrations for assistance in explaining the process of unerasable domain occurrence in the fifth embodiment.
Figure 7B:
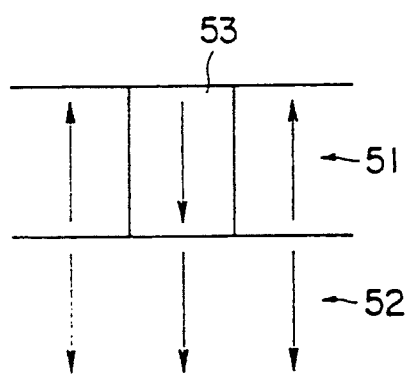
Figure 7C:
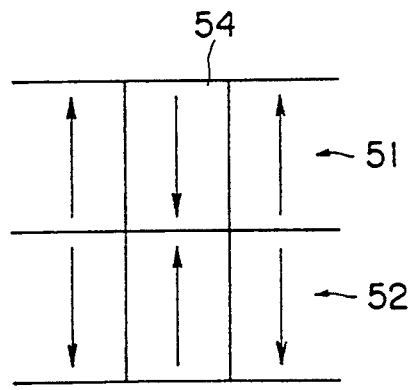

FIGS. 7(a) to (c) show apparent magnetization directions of the respective layers obtained in the L recording, by use of arrows. Further, in these drawings, the memory layer 51 is a rare earth-transition metal alloy ferrimagnetic film dominant in transition metal magnetic moment at room temperature, and the reference layer 52 is a rare earth-transition metal alloy ferrimagnetic film dominant in rare earth metal magnetic moment and having a compensation temperature between room temperature and the Curie point.

When an ideal L recording is effected, the magnetization of the memory layer 51 is directed toward the side at which no interface wall exists relative to the reference layer 52, as shown in FIG. 7(a). In practice, however, unerasable switched domains 53 or 54 can be often observed in the memory layer 51, as shown in FIG. 7(b) or 7(c).

The reason why these unerasable domains 53 or 54 exist may be due to the fact that the transcription based upon the reference layer magnetization is not effected at some parts of the memory layer and minute domains are formed because of fluctuations of the magnetic characteristics of the recording medium or of delay of focus servomechanism following operation, or that non-switched domains remain in the reference layer in the initialization process. To prevent these unerasable domains from being produced, it is possible to consider some countermeasures such that the laser beam intensity is increased in the L recording or the initializing field intensity is increased. These methods can improve the above-mentioned problem to some extent. In the former method, however, there exists such a drawback that the allowable range of the appropriate laser beam intensity for the L recording is narrowed. Further, the latter method is not practical because it is rather difficult to generate a strong initializing field from the design viewpoint of the recording apparatus. In addition, there exists such a demand that a magnetic film having a high Curie temperature must be used for the memory layer in order to improve the quality of reproduced signals. To satisfy this demand, there exists another problem in that the intensity of the laser beam power required for the L recording inevitably increases.

In the embodiment of the apparatus shown in FIG. 6, after direct overwrite has been completed, since the medium 41 is passed through the correcting field generated by the magnet 46 and additionally through the initializing field generated by the magnet 44, it is possible to effectively eliminate the unerasable domains produced at the L recording.

The principle of eliminating these unerasable domains will be described in further detail hereinbelow.

As disclosed in Japanese Published Unexamined (Kokai) Pat. Appli. Nos. 62-175948 or 63-153752, the medium must satisfy in magnetic characteristics at room temperature the following expression:

$$\sigma_W/2M_{s2}h_2 < H_{c2} < H_{c1} \quad (3)$$

where $\sigma_W$ denotes the interface wall energy density between the memory layer and the reference layer; $M_{s2}$ denotes the saturation magnetization of the reference layer; $h_2$ denotes the film thickness of the reference layer; $H_{c1}$ denotes the coercivity of the memory layer; and $H_{c2}$ denotes the coercivity of the reference layer.

As already explained, the unerasable domains at the L recording are in the status as shown in FIGS. 7(b) or 7(c).

Figure 8A:
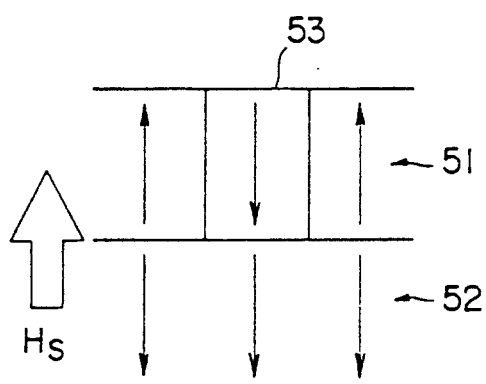
FIGS. 8(a), (b), (c) and (d) illustrations for assistance in explaining the process of unerasable domain elimination.

First, the case is studied where a correcting field $H_S$ opposite in direction to the initializing field as shown in FIG. 8(a) is applied to unerasable domains 53 as shown in FIG. 7 (b).

Figure 8B:
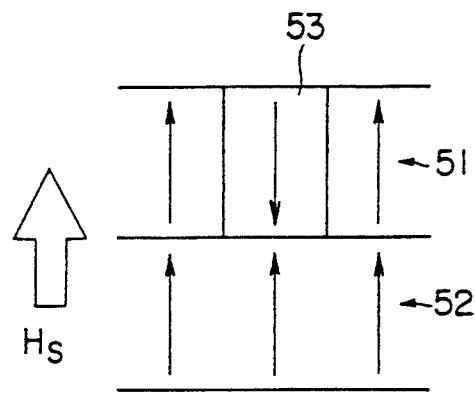

When the correcting field intensity $H_S$ satisfies the following expression:

$$0 < H_S < H_{c2} + \sigma_W/2M_{s2}h_2 \quad (4)$$

where $\sigma_B$ denotes the domain wall energy density of the memory layer 51; $M_{s1}$ denotes the saturation magnetization of the memory layer 51; $h_1$ denotes the film thickness of the memory layer 51; and R denotes the radius of unerasable domain 53, and further when the radius R of the unerasable domain 53 satisfies the expression as $$R < \sigma_B h_1 / \{-\sigma_W + 2M_{s1}h_1(H_{c1} - H_S)\} \quad (5)$$

in accordance with a simple consideration based upon the bubble theory (the term of demagnetizing field related to domain wall assumed as a proper circle is disregarded), it is known that the unerasable domain 53 is collapsed so that the domain change to the correct status as shown in FIG. 8(b).

Figure 8C:
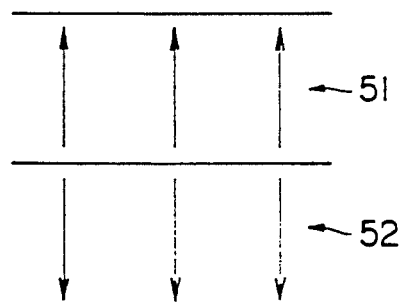
Figure 8D:
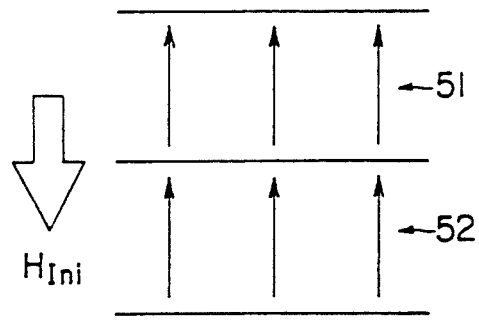

Further, when the correcting field intensity HS satisfies the following expression:

$$0 < H_{c2} + \sigma_W/2M_{s2}h_2 < H_S < H_{c1} + \sigma_W/2M_{s1}h_1 \quad (6)$$

and further when the radius R of the unerasable domain 53 satisfies the expression as $$R < \sigma_B h_1 / \{\sigma_W + 2M_{s1}h_1(H_{c1} - H_S)\} \quad (7)$$

it is known that the reference layer 52 is first magnetized uniformly as shown in FIG. 8(c) and then the domains change to the status as shown in FIG. 8(d). Under these conditions, when the initializing field $H_{Ini}$ is applied, the domains change to the correct status as shown in FIG. 8(b).

On the other hand, in the case of the unerasable domains as shown in FIG. 7(c), when the correcting field intensity $H_S$ satisfies the expression (4), the unerasable domain 54 is not collapsed immediately after the correcting field is applied. However, when the initializing field is applied, since the reference layer 52 can be magnetized uniformly as shown in FIG. 7(b), the unerasable domain 54 is collapsed in accordance with the expression (5) by applying again the correcting field to the rotating medium 41 through the same process as already explained. Further, when the correcting field intensity $H_S$ satisfies the expression (6), the unerasable domain 54 is collapsed in accordance with the expression (7) through the already considered process as shown in FIG. 7(b).

Further, the states of the switched (recorded) domains formed by the H recording immediately after and before the correcting field and initializing field are applied are similar to those as shown in FIGS. 7(b) and (c), except that the radii of the recorded domains are larger than those of the unerasable domains. Accordingly, since the above-mentioned recorded domains behave in accordance with the domain theory, as far as the radii of the recorded domains are large to such an extent as not to satisfy the expressions (5) and (7), the recorded domains will not be collapsed. In other words, it is important to determine the intensity of the correcting field $H_S$ to such an appropriate value that unerasable domains of relatively small radii are collapsed but recorded domains of relatively large radii are not collapsed in accordance with the expressions (5) and (7).

Here, it is possible to collapse unerasable domains by applying the correcting field whose intensity HS lies within a range determined by the expression (4) or a range determined by the expression (6). However, as is understandable by the expressions (5) and (7), the unerasable domains can be collapsed by a much smaller correcting field when the expression (4) is satisfied. Therefore, in practice it is preferable to realize the collapse of unerasable domains by satisfying the expression (4).

Now, an important point of the beam modulation overwrite method using an exchange-coupled multilayer film is that the reference layer must be magnetized uniformly before a recording beam is irradiated upon the medium. That is, it is necessary to apply the initializing field to the medium before the succeeding recording operation begins. Therefore, in order to realize both the unerasable domain collapse by applying the correcting field so as to satisfy the above-mentioned expression (4) and the direct overwrite recording, it is necessary to apply the correcting field and the initializing field in sequence to the medium after a recording beam has been irradiated but before the succeeding recording or reproduction begins.

Figure 9:
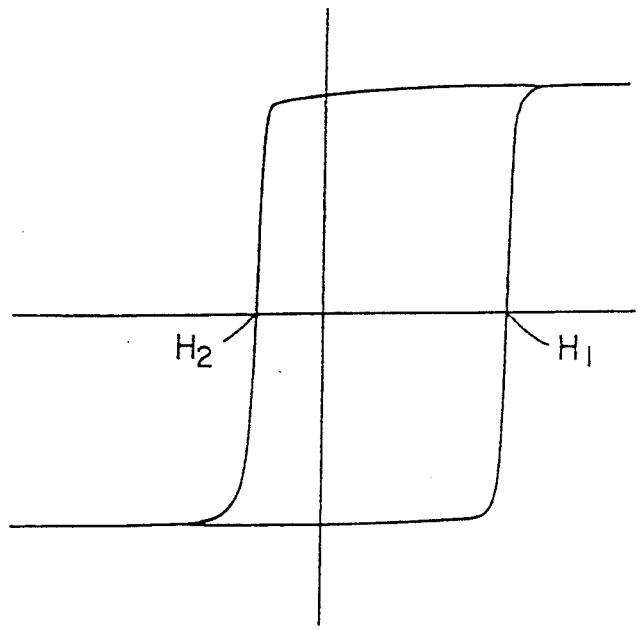
FIG. 9 is a graphical representation showing a minor loop of the magnetization curve of the reference layer of the medium used for the fifth embodiment.

Here, FIG. 9 shows a minor magnetization curve of the reference layer. As already explained, if the intensities of two different switching fields of the reference layer are defined as $H_1$ and $H_2$ as shown in FIG. 9, it is possible to realize an excellent direct overwrite by eliminating unerasable domains by applying in sequence the correcting field HS lying within a range of $0<H_S<H_1$ and having a direction opposite to the initializing field, and the initializing field whose intensity is larger than $H_1$ to the medium, after the recording beam has been irradiated upon the medium. From the practical standpoint, the lower limit of the correcting field intensity $H_S$ is about 500 to 1000 Oe in general, although being different according to the recording medium.

The above-explained principle of realizing the collapse of unerasable domains can be similarly applied to various recording mediums such as exchange-coupled film different in type from the above-mentioned case, recording medium provided with an intermediate layer effective to reduce the domain wall energy between two layers, etc.

In accordance with the above-mentioned principle, in the case of the embodiment shown in FIG. 6, all the recording operations can be completed when the medium has been rotated at least once or twice where required after a recording beam had been irradiated upon the medium.

Figure 10:
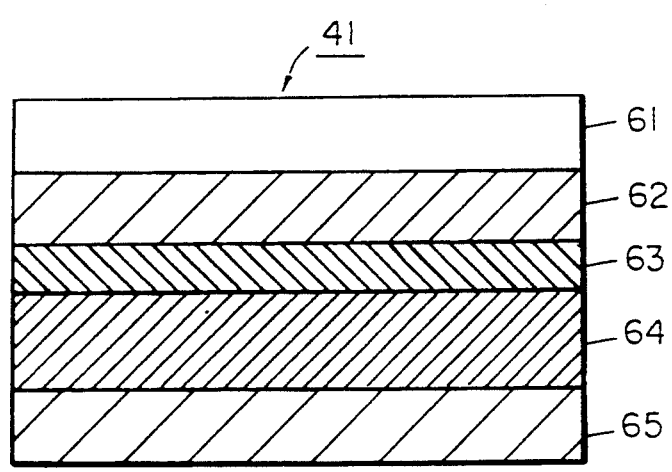
FIG. 10 is a cross-sectional view showing a structure of a medium used for the evaluation test of the fifth embodiment.

For the evaluation test of this embodiment, recording media 41 as shown in FIG. 10 were prepared. Each medium 41 was formed by laminating a 80 nm thick protective layer 62, a 50 nm thick memory layer 63, a 100 nm thick reference layer 64 and a 80 nm thick protective layer 65 in sequence on a resin substrate 61. Here, the memory layer 63 was formed of NdDyTbFeCo dominant in sub-lattice magnetization of transition metal at room temperature (referred to as TM rich); the reference layer 64 was formed by DyFeCo dominant in sub-lattice magnetization of rare earth metal (referred to as RE rich); and the protective layer 65 was formed of AlSiN. Further, two kinds of media (medium A and medium B) constructed in the same way as described above but different in magnetic characteristics from each other were prepared. Table 1 lists the apparent coercivities $H_m$ and $H_r$ of the memory layer 63 and the reference layer 64 in the respective medium samples. Here, the apparent coercivity indicates a value obtained by shifting the coercivity of a single layer film, as a result of the exchange-coupling between the memory layer 63 and the reference layer 64. With respect to the reference layer 64, however, the apparent coercivity $H_r$ indicates a value larger in absolute value (i.e. $H_1$ in FIG. 9) of the two switching fields of the minor loop of the magnetization curve.

TABLE 1

|  | Medium A | Medium B |
| --- | --- | --- |
| $H_m$ | 13.0 kOe | 14.2 kOe |
| $H_r$ | 2.8 kOe | 3.7 kOe |

As described above, these test media were formed with a TM-rich memory layer 63 and an RE-rich reference layer 64, respectively. In this case, the initializing field was applied in the direction the same as the recording field, and the correcting field was applied in the direction opposite to the recording field.

The allowable range of the laser beam power at the L recording, that is, the power margin was evaluated by measuring the intensity of a 7 MHz unerasable signal obtained when a 7 MHz signal was once recorded and then a 2 MHz signal was overwritten, by use of a spectrum analyzer. In this evaluation test, a travel speed of the recording medium relative to the laser spot was 15 m/sec in both recording and reproducing; the laser wavelength was 780 nm; and the laser power at the H recording was 15 mW.

Figure 11:
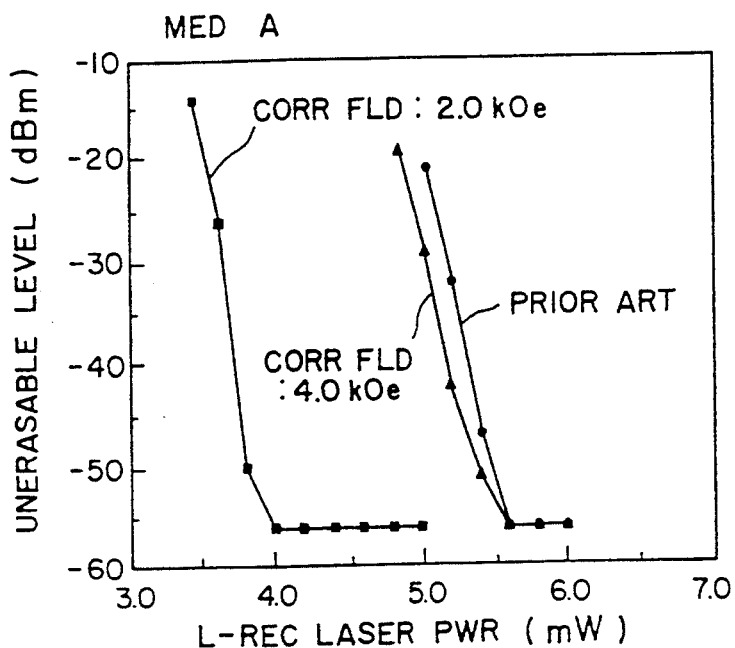
FIGS. 11(a) and (b) are graphical representations showing the evaluation test results of the fifth embodiment.
Figure 11:
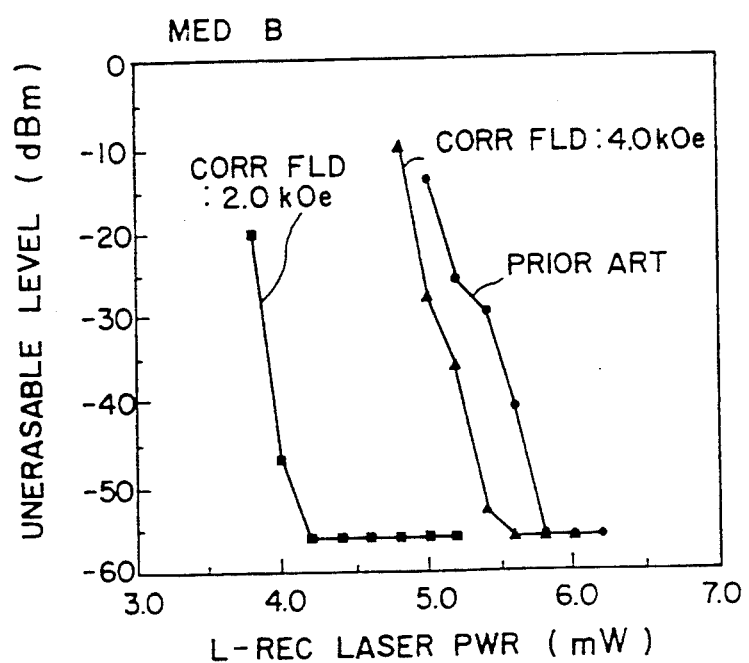

FIGS. 11(a) and (b) show the relationship between the unerasable signal level and the L recording laser power obtained when data are overwritten on the medium A and the medium B, respectively. Here, the initializing field was 4.0 kOe, and the correcting fields were two levels of 2.0 kOe and 4.0 kOe. In addition, unerasable signal levels obtained without applying any correcting field as is conventional were shown for comparison in FIGS. 11(a) and (b). These graphs indicates that it possible to increase the L recording power margin by applying a correcting field of an appropriate intensity. In particular, when the intensity of the correcting field is 2.0 kOe, since the minimum value of the allowable laser power decreases about 1.5 mW in both the media A and B, it is possible to effectively increase the L recording laser power margin.

Figure 12A:
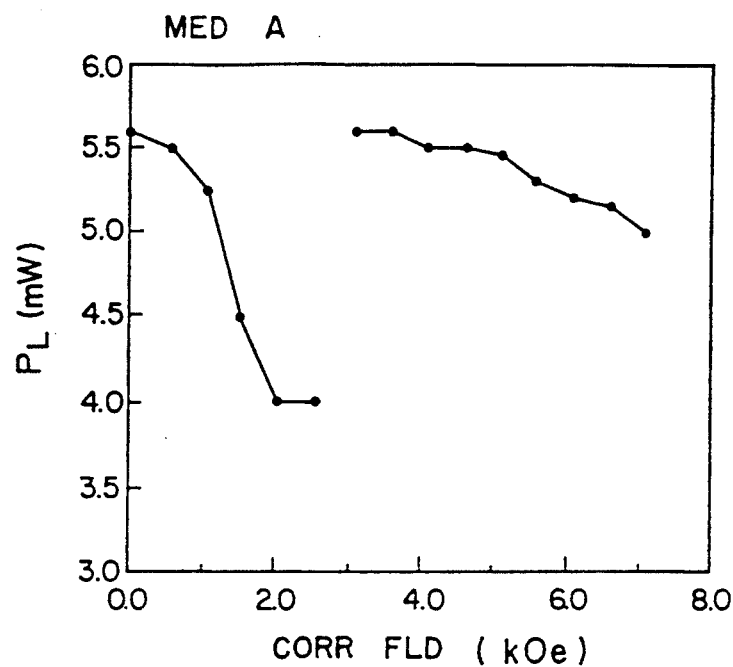
FIGS. 12(a) and (b) are also graphical representations showing the evaluation test results of the fifth embodiment.
Figure 12B:
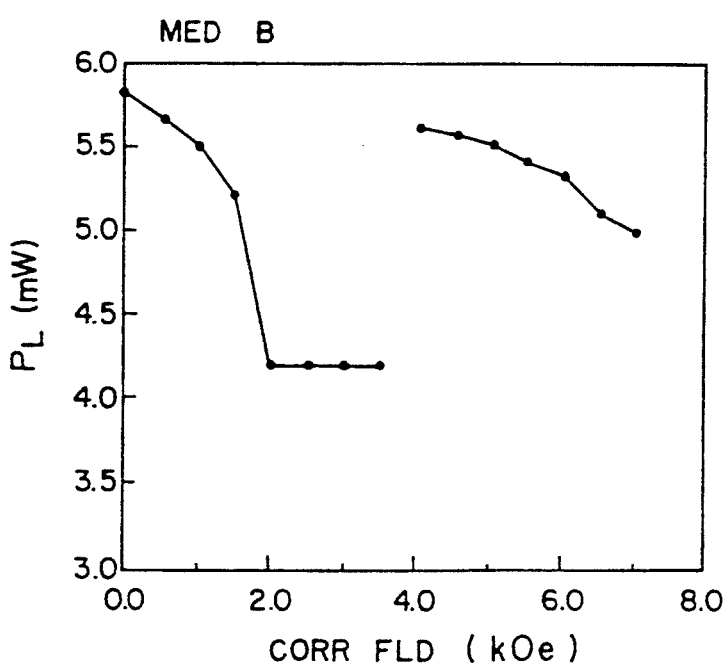

FIGS. 12(a) and (b) show the relationship between the minimum value of the allowable L recording laser power $P_L$ and the correcting field intensity (changed 0.5 by 0.5 kOe from 0 to 7.0 kOe), for both the media A and B, respectively. Here, the initializing field was 4.0 kOe. FIGS. 12(a) and (b) and table 1 in combination indicate that $P_L$ decreases continuously when the correcting field intensity increases from 0 Oe to the apparent coercivity ($H_r$ 2.8 kOe in A and 3.7 kOe in B) of the reference layer, but increases (returns) discontinuously up to near a value corresponding to the zero correcting field intensity when the correcting field intensity exceeds $H_r$, further decreasing gradually thereafter. Therefore, it is understood that the correcting field contributes markedly to a decrease in $P_L$, that is, an increase in the L recording power margin in a range of $H_r$ or less, in particular.

Further, in this embodiment, a test was made to clarify that it is possible to increase the medium's Kerr rotational angle by increasing the Curie temperature of the memory layer without deteriorating the L recording power margin and the L recording sensitivity. In the prepared recording media as shown in FIG. 10, a 50 nm thick NdDyTbFeCo film was used as the memory layer 63; a 100 nm thick DyFeCo film was used as the reference layer; and 80 nm thick AlSiN films were used as the protective layers 62 and 65, respectively. Two kinds of media (medium C and medium D) constructed as described above but different in magnetic characteristics were prepared. In both the media, the memory layer 63 was TM-rich and the reference layer 64 was RE rich. Further, the composition of the reference layer 64 was the same in both the media C and D. Table 2 lists the Curie temperature Tc of the memory layers 63 of these media, and the apparent coercivities $H_m$ and $H_r$ of the memory layers 63 and the reference layers 64 of these media.

TABLE 2

|  | Medium C | Medium D |
| --- | --- | --- |
| Tc | 120° C. | 140° C. |
| $H_m$ | 13.5 kOe | 14.0 kOe |

TABLE 2-continued

|  | Medium C | Medium D |
|---|---|---|
| $H_r$ | 2.8 kOe | 2.6 kOe |

Since these media were formed of such a composition that the memory layer was TM rich and the reference layer was RE rich, the initializing field was applied in the direction the same as that of the recording field, and the correcting field was applied in the direction opposite to that of the recording field. The travel speed of the medium relative to the beam spot was 17 m/sec in the recording/reproducing operation. A signal of 2 MHz was overwritten on a 7 MHz previously recorded signal. The laser power at the H recording was fixed to 15 mW and the initializing field intensity was 4.0 kOe. The correcting field intensity was 2.0 kOe. For comparison, the test was made when the correcting field intensity was 0 kOe.

Table 3 lists the above-mentioned test results, in which the minimum allowable L recording laser powers $P_L$ and the carrier/noise (C/N) ratios of the overwritten signals are shown.

TABLE 3

|  | Medium C | | Medium D | |
|---|---|---|---|---|
| Corr. field | $P_L$ | C/N | $P_L$ | C/N |
| 0.0 kOe | 4.8 mW | 53 dB | 5.3 mW | 55 dB |
| 2.0 kOe | 4.3 mW | 53 dB | 4.7 mW | 55 dB |

Table 3 indicates that the C/N ratio is high in the medium D formed with the memory layer of a higher Curie temperature and further $P_L$ is also high in the medium D. However, even in the case of the medium of higher Curie temperature, when the correcting field is applied, it is possible to decrease $P_L$ down to a value corresponding to the case obtained when data are recorded on the medium C without applying the correcting field. This indicates that the sensitivity to the laser power at the L recording can be increased. In other words, it has been proved that when the correcting field is applied, the Curie temperature of the memory layer can be raised without decreasing the power margin and the recording sensitivity at the L recording, so that the Kerr rotational angle can be increased and thereby the C/N ratio of the medium can be improved.

Further, the test results similar to the above-mentioned results were obtained with respect to the media in which the magnetic layers 63 and 64 shown in FIG. 10 were formed of TbFeCo, TbFeCoCr, DyTbFeCo, NdDyFeCo, SmDyFeCo, PrDyFeCo, etc., respectively.

6th Embodiment

Figure 13:
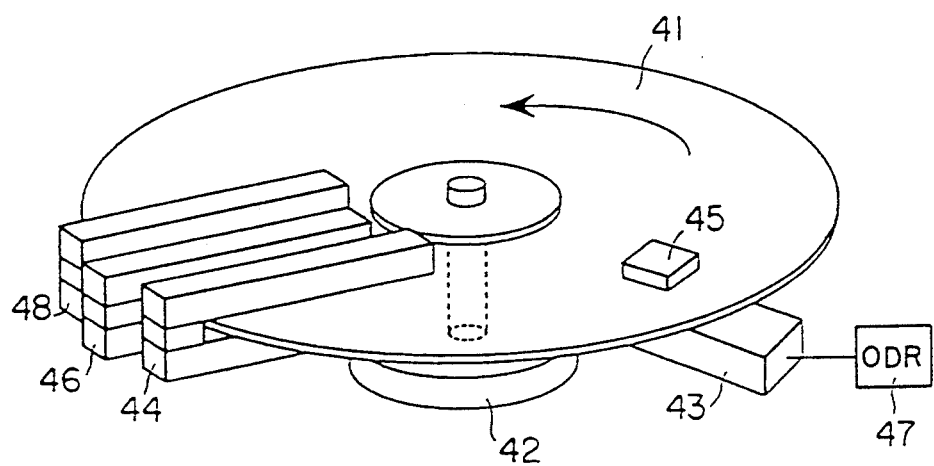
FIG. 13 is a perspective view showing a construction of a sixth embodiment obtained by modifying the fifth embodiment.

FIG. 13 shows a sixth embodiment obtained by modifying the fifth embodiment shown in FIG. 6, in which an additional permanent magnet 48 for generating a second correcting field is provided along the rotational course of the medium 41, in the order of the permanent magnet 48, the permanent magnet 46 for generating the first correcting field and the permanent magnet 44 for generating the initializing field. Further, these permanent magnets 48, 46 and 44 can be replaced with electromagnets. The direction of the second correcting field is the same as that of the initializing field. However, the direction of the first correcting field is opposite to that of the second correcting and initializing fields. When rotated, therefore, the medium 41 is repeatedly passed through the second correcting field generated by the magnet 48, the first correcting field by the magnet 46 and the initializing field by the magnet 44, and the recording/reproducing field by the magnet 45, sequentially.

The recording/reproducing operation is the same as in the fifth embodiment.

In this embodiment, since fields opposite in direction to the first correcting field are applied to the medium immediately before and after the first correcting field is applied, all the operations required for recording can be completed when the medium 41 has rotated once after a recording beam irradiation upon the medium.

For the evaluation test of this embodiment, the recording media as shown in FIG. 10 were prepared. In the prepared media, a 50 nm thick NdDyTbFeCo film was used as the memory layer 63; a 100 nm thick DyFeCo film was used as the reference layer 64; and 80 nm thick AlSiN films were used as the protective layers 62 and 65. Two kinds of media (medium E and medium F) different in magnetic characteristics were prepared. Table 4 lists the apparent coercivities $H_m$ and $H_r$ of the memory layers 63 and the reference layer 64 of these media.

TABLE 4

|  | Medium E | Medium F |
|---|---|---|
| $H_m$ | 12.5 kOe | 13.8 kOe |
| $H_r$ | 2.7 kOe | 3.8 kOe |

In these media, the memory layers 63 was TM rich and the reference layers 64 was RE rich. Therefore, the second correcting and initializing fields were applied in the direction the same as that of the recording/reproducing field, but the first correcting field was applied in the direction opposite to that of recording/reproducing field.

Figure 14:
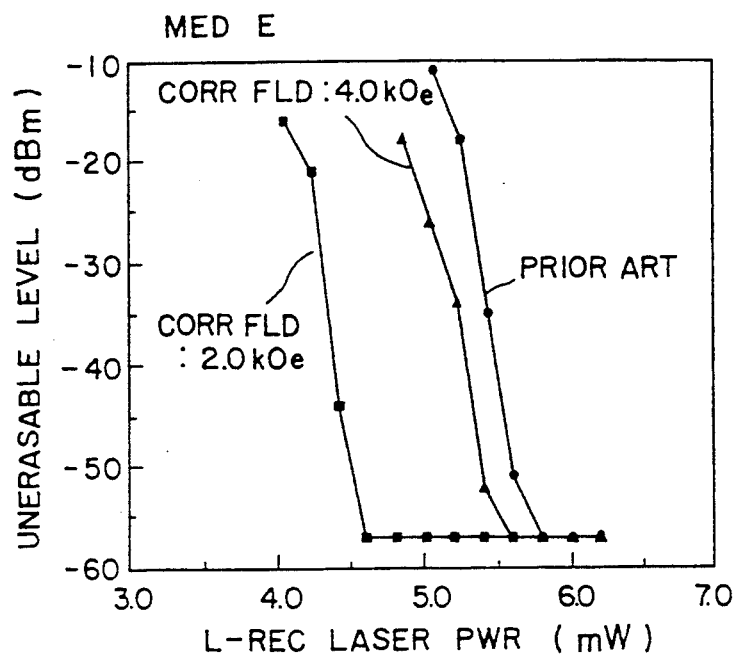
FIGS. 14(a) and (b) are graphical representations showing the valuation test results of the sixth embodiment.
Figure 14:
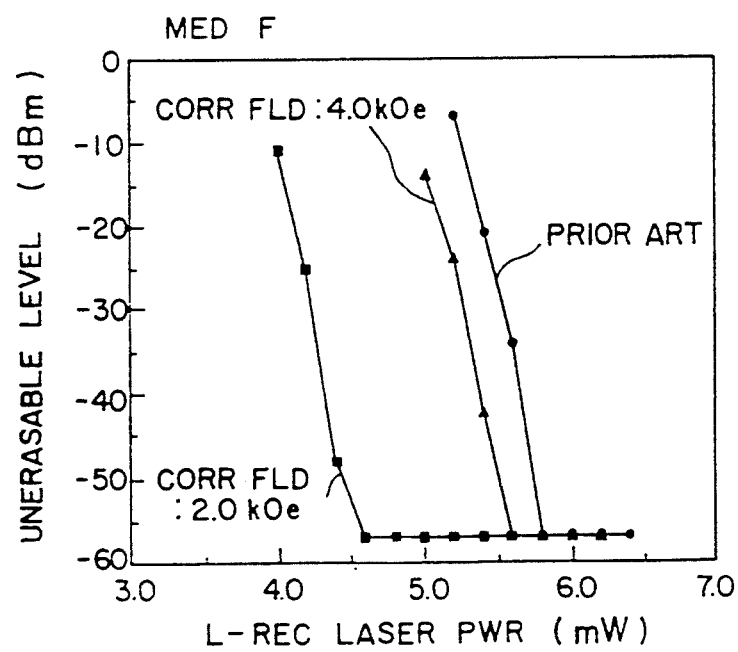

FIGS. 14(a) and (b) show the relationship between the unerasable signal level and the L recording laser power obtained when a 2 MHz signal was overwritten on a 7 MHz signal previously recorded on the media E and F, respectively under the conditions that the medium travel speed was 17 m/sec at recording/reproducing; the laser wavelength was 780 nm; and the recording laser power at the H recording was 15 mW. Further, the second correcting field intensity and the initializing field intensity were both 4.0 kOe, and the first correcting field intensity was 2.0 kOe. For comparison, data obtained in accordance with the conventional method in which no correcting field was applied are also shown. FIGS. 14(a) and (b) indicate that when correcting fields of appropriate intensities are applied to the media, it is possible to reduce the minimum value $P_1$ of the allowable L recording laser power as much as 1.5 mW or more.

In this evaluation test, immediately after the recording operation completion, the laser beam was jumped by one track, and the reproduction operation was made by applying the second correcting field, the first correcting field and the initializing field once to the recording area in this order between the recording operation and the reproducing operation. Therefore, it is possible to eliminate the unerasable domains 54 as shown in FIG. 7(c), in addition to the unerasable domains 53 as shown in FIG. 7(b) by the single revolution of the medium after recording operation. For comparison, the dependency of unerasable signals upon the L recording laser power was measured by use of the medium E by taking the cases where no second correcting field was applied (corresponding to the fifth embodiment) and no first and second correcting fields were applied (corresponding to the prior-art method). FIG. 15 shows the test results, in which the graph (a) indicates the case of absence of the second correcting field; the graph (b) indicates the case of absence of both the first and second correcting fields; and the graph (c) indicates the case of presence of both the first and second correcting fields. FIG. 15 indicates that the minimum value of the allowable L recording laser power in the graph (a) is lower than that of the graph (b) so that the L recording power margin can be increased. Further, although there exists no difference in the minimum value of the allowable L recording laser power between the graphs (a) and (c), there exists a difference of about 5 dB in the unerasable signal level between the two. In other words, in this embodiment, it is possible to excellently eliminate the unerasable domains 54 as shown in FIG. 7(c) which cannot be eliminated through a single medium revolution in the fifth embodiment, by further applying the second correcting field, in spite of a single medium revolution.

Further, the test results similar to the above-mentioned results were obtained with respect to the media in which the magnetic layers 63 and 64 shown in FIG. 10 were formed of TbFeCo, TbFeCoCr, DyTbFeCo, NdDyFeCo, SmDyFeCo, PrDyFeCo, etc., respectively.

The above-mentioned embodiments have been described by taking the case of the apparatus for both recording and reproducing data. Without being limited thereto, it is of course possible to apply the present invention to the apparatus for only recording or reproducing data. The feature common in these embodiments is that the correcting field is applied to the medium after the recording operation or before the reproducing operation or between the recording and reproducing operations. According to the present invention, since the correcting field is applied to the medium after data have been recorded or before the recorded data are reproduced, it is possible to eliminate recording noise such as unerasable magnetic domains or magnetic domain distortion.

Some embodiments of the present invention have been described by way of example. Without being limited thereto, however, various changes and modifications may be made in the invention, without departing from the spirit thereof.

What is claimed is:

1. A magneto-optical method of recording data in a direct overwrite manner to a perpendicular magnetized film consisting of a single magnetic layer, comprising:
   (a) a recording step of forming, in the perpendicular magnetized film, bubble magnetic domains representing the data whose magnetization direction are in a first direction and whose radii are larger than a predetermined minimum stable domain radius by simultaneously applying a recording laser beam whose intensity is modulated according to the data and a recording magnetic field to the perpendicular magnetized film; and
   (b) a correcting step of applying a correcting magnetic field to the perpendicular magnetized film in a second direction opposite to the first direction, the correcting magnetic field having a intensity $H_s$ smaller than a wall coercivity $H_c$ of the bubble magnetic domains, the intensity $H_S$ satisfying the equation:

$$R = \sigma_B / \{2 M_S (H_C - H_S)\}$$

where R is the predetermined minimum stable domain radius, $\sigma_S$ is a domain wall energy density of the bubble magnetic domains, and Ms is a saturation magnetization of the perpendicular magnetized film.

2. A magneto-optical method of recording data in a direct overwrite manner to a perpendicular magnetized film consisting of a single magnetic layer, comprising:
   (a) a recording step of forming, in the perpendicular magnetized film, bubble magnetic domains representing the data whose magnetization directions are in first and second mutually opposite directions and whose radii are larger than a predetermined minimum stable domain radius by simultaneously applying a recording laser beam and a recording magnetic field whose direction is modulated according to the data to the perpendicular magnetized film; and
   (b) a correcting step of applying at least one of a first correcting magnetic filed in the first direction and a second correcting magnetic field in the second direction to the perpendicular magnetized film, each of the first and the second correcting magnetic fields having an intensity $H_s$ smaller than a wall coercivity $H_c$ of the bubble magnetic domains, the intensity $H_s$ satisfying the equation:

$$R = \sigma_B / \{2 M_S (H_C - H_S)\}$$

where R is the predetermined minimum stable domain radius, $\sigma_B$ is a domain wall energy density of the bubble magnetic domains, and $M_s$ is a saturation magnetization of the perpendicular magnetized film.

3. The method of claim 2, wherein the correcting step includes the steps of applying the first correcting magnetic field to the perpendicular magnetized film, and then applying the second correcting magnetic field to the perpendicular magnetized film.

4. A magneto-optical method of recording data in a direct overwrite manner to a perpendicular magnetized film including a memory layer and a reference layer mutually exchange-coupled, the reference layer having an apparent coercivity Hr smaller than an apparent coercivity $H_m$ of the memory layer, the method comprising:
   (a) a recording step of forming, in the memory layer, bubble magnetic domains representing the data whose magnetization directions are in a first direction by simultaneously applying a recording laser beam whose intensity is modulated according to the data and a recording magnetic field to the perpendicular magnetized film;
   (b) a correcting step of, after the recording step, applying a correcting magnetic field to the perpendicular magnetic film in a second direction opposite to the first direction, the correcting magnetic field having a predetermined intensity $H_s$ smaller than the apparent coercivity $H_r$ of the reference layer;
   (c) an initializing step of, after the correcting step, applying an initializing magnetic field to the perpendicular magnetized film in the first direction, the initializing magnetic field having a predetermined intensity $H_i$ larger than the apparent coercivity $H_r$ of the reference layer and smaller than the apparent coercivity $H_m$ of the memory layer; and (d) after the recording step and before the correcting step, applying an additional initializing magnetic field to the perpendicular magnetized film in the first direction, the additional initializing magnetic field having an intensity larger than the apparent coercivity $H_r$ of the reference layer and smaller than the apparent coercivity $H_m$ of the memory layer.

5. A magneto-optical apparatus for recording data in a direct overwrite manner to a perpendicular magnetized film, as a recording medium, consisting of a single magnetic layer, the apparatus comprising:

(a) moving means for moving the recording medium along a course;

(b) recording means disposed at a predetermined position along said course of the recording medium for applying a recording laser beam whose intensity is modulated according to data to be recorded and a recording magnetic field to the recording medium so as to form, in the perpendicular magnetized film, bubble magnetic domains representing the data whose magnetization directions are in a first direction and whose radii are larger than a predetermined minimum stable domain radius; and (c) correcting means disposed downstream of said recording means along said course of the recording medium for applying a correcting magnetic field to the perpendicular magnetized film in a second direction opposite to the first direction, the magnetic field having an intensity $H_s$ smaller than a wall coercivity $H_c$ of the magnetic domains, the intensity $H_s$ satisfying the equation:

$$R = \sigma_B/\{2M_S(H_C - H_S)\}$$

where R is the predetermined minimum stable domain radius, $\sigma_B$ is a domain wall energy density of the bubble magnetic domains, and $M_S$ is a saturation magnetization of the perpendicular magnetized film.

6. The magneto-optical recording apparatus of claim 5, wherein said moving means rotates the recording medium; and said recording means and said correcting means are disposed along an arcuate course of said recording medium at two different angular positions, respectively.

7. A magneto-optical apparatus for recording data in a direct overwrite manner to a perpendicular magnetized film, as a recording medium, consisting of a single magnetic layer, the apparatus comprising:

(a) moving means for moving the recording medium along a course;

(b) recording means disposed at a predetermined position along said course of the recording medium for applying a recording laser beam and a recording magnetic field whose direction is modulated according to data to be recorded to the recording medium so as to form, in the perpendicular magnetized film, bubble magnetic domains representing the data whose magnetization directions are in first and second mutually opposite directions and whose radii are larger than a predetermined minimum stable domain radius; and (c) correcting means disposed downstream of said recording means along said course of the recording medium for applying at least one of a first correcting magnetic field in the first direction and a second correcting magnetic field in the second direction to the perpendicular magnetized film, each of the first and the second correcting magnetic fields having an intensity $H_s$ smaller than a wall coercivity $H_c$ of the magnetic domains, the intensity $H_s$ satisfying the equation:

$$R = \sigma_B/\{2M_S(H_C - H_S)\}$$

where R is the predetermined minimum stable domain radius, $\sigma_B$ is a domain wall energy density of the bubble magnetic domains, and $M_S$ is a saturation magnetization of the perpendicular magnetized film.

8. The magneto-optical recording apparatus of claim 7, wherein said moving means rotates the recording medium; and said recording means and said correcting means are disposed along an arcuate course of said recording medium at two different angular positions, respectively.

9. The magneto-optical recording apparatus of claim 7, wherein the correcting means includes first magnet means for applying the first correcting magnetic field to the recording medium, and second magnet means disposed downstream of the first magnet means along said course of the recording medium for applying the second correcting magnetic field to the recording medium.

10. A magneto optical apparatus for recording data in a direct overwrite manner to a perpendicular magnetized film, as a recording medium, including a memory layer and a reference layer mutually exchange-coupled, the reference layer having an apparent coercivity $H_r$ smaller than an apparent coercivity $H_m$ of the memory layer, the apparatus comprising:

(a) moving means for moving the recording medium along a course;

(b) recording means disposed at a predetermined position along said course of the recording medium for applying a recording laser beam whose intensity is modulated according to data to be recorded and a recording magnetic field to the recording medium so as to form, in the memory layer, bubble magnetic domains representing the data whose magnetization direction are in a first direction;

(c) correcting means disposed downstream of the recording means along said course of the recording medium for applying a correcting magnetic field to the recording medium in a second direction opposite to the first direction, the correcting magnetic field having a predetermined intensity $H_s$ smaller than the apparent coercivity $H_s$ of the reference layer;

(d) initializing means disposed downstream of the correcting means along said course of the recording medium for applying an initializing magnetic field to the recording medium in the first direction, the initializing magnetic field having a predetermined intensity $H_i$ larger than the apparent coercivity $H_r$ of the reference layer and smaller than the apparent coercivity $H_m$ of the memory layer; and (e) means disposed between the recording means and the correcting means along said course of the recording medium for applying an additional initializing magnetic field to the recording medium in the first direction, the additional initializing magnetic field having an intensity larger than the apparent coercivity $H_r$ of the reference layer and smaller than the apparent coercivity $H_m$ of the memory layer.

11. The magneto-optical recording apparatus of claim 10, wherein said moving means rotates the recording medium; and said recording means, said correcting means and said initializing means are disposed along an arcuate moving course of said recording medium at two different angular positions, respectively.

12. A magneto-optical method of reproducing data represented by bubble magnetic domains formed in a perpendicular magnetized film consisting of a single magnetic layer, the bubble magnetic domains being magnetized in a first direction, the method comprising:
   (a) a correcting step of applying a correcting magnetic field to the perpendicular magnetized film in a second direction opposite to the first direction, the correcting magnetic field having an intensity $H_s$ smaller than a wall coercivity $H_c$ of the bubble magnetic domains, the intensity $H_s$ satisfying the equation:

$$R = \sigma_B / \{2M_S(H_C - H_S)\}$$

where R is the predetermined minimum stable domain radius smaller than the radii of the bubble magnetic domains representing the data, $\sigma_B$ is a domain wall energy density of the bubble magnetic domains, and $M_s$ is a saturation magnetization of the perpendicular magnetized film; and
   (b) a reproducing step of, after the correcting step, reproducing the data by magneto-optically detecting the bubble magnetic domains in the perpendicular magnetized film.

13. A magneto-optical method of reproducing data represented by bubble magnetic domains formed in a perpendicular magnetized film consisting of a single magnetic layer, the bubble magnetic domains being magnetized in first and second mutually opposite directions, the method comprising:
   (a) a correcting step of applying at least one of a first correcting magnetic field in the first direction and a second correcting magnetic field in the second direction, each of the first and the second correcting magnetic fields having an intensity $H_s$ smaller than a wall coercivity $H_c$ of the bubble magnetic domains, the intensity $H_s$ satisfying the equation:

$$R = \sigma_B / \{2M_S(H_C - H_S)\}$$

where R is the predetermined minimum stable domain radius smaller than the radii of the bubble magnetic domains representing the data, $\sigma_B$ is a domain wall energy density of the bubble magnetic domains, and $M_s$ is a saturation magnetization of the perpendicular magnetized film; and
   (b) a reproducing step of, after the correcting step, reproducing the data by magneto-optically detecting the bubble magnetic domains in the perpendicular magnetized film.

14. A magneto-optical apparatus for reproducing data represented by bubble magnetic domains formed in a perpendicular magnetized film, as a recording medium, consisting of a single magnetic layer, the bubble magnetic domains being magnetized in a first direction, the apparatus comprising:
   (a) moving means for moving the recording medium along a course;
   (b) correcting means disposed at a predetermined position along said course of the recording medium for applying a correcting magnetic field to the recording medium in a second direction opposite to the first direction, the correcting magnetic field having an intensity $H_s$ smaller than a wall coercivity $H_c$ of the bubble magnetic domains, the intensity $H_s$ satisfying the equation:

$$R = \sigma_B / \{2M_S(H_C - H_S)\}$$

where R is a predetermined minimum stable domain radius smaller than the radii of the bubble magnetic domains representing the data, $\sigma_B$ is a domain wall energy density of the bubble magnetic domains, and $M_s$ is a saturation magnetization of the perpendicular magnetized film; and
   (c) reproducing means disposed downstream of the correcting means along said course of the recording medium for reproducing the data by magneto-optically detecting the bubble magnetic domains in the recording medium.

15. A magneto-optical apparatus for reproducing data represented by bubble magnetic domains formed in a perpendicular magnetized film, as a recording medium, consisting of a single magnetic layer, the bubble magnetic domains being magnetized in first and second mutually opposite directions, the apparatus comprising:
   (a) moving means for moving the recording medium along a course;
   (b) correcting means for applying at least one of a first correcting magnetic field in the first direction and a second correcting magnetic field in the second direction to the recording medium, each of the first and the second correcting magnetic fields having an intensity $H_s$ smaller than a wall coercivity $H_c$ of the bubble magnetic domains, the intensity $H_s$ satisfying the equation:

$$R = \sigma_B / \{2M_S(H_C - H_S)\}$$

where R is a predetermined minimum stable domain radius smaller than the radii of the bubble magnetic domains representing the data, $\sigma_B$ is a domain wall energy density of the bubble magnetic domains, and $M_s$ is a saturation magnetization of the perpendicular magnetized film; and
   (c) reproducing means disposed downstream of the correcting means along said course of the recording medium for reproducing the data by magneto-optically detecting the bubble magnetic domains in the recording medium.

16. A magneto-optical method of recording data in a direct overwrite manner to a perpendicular magnetized film including a memory layer and a reference layer mutually exchange-coupled, the reference layer having an apparent coercivity Hr smaller than an apparent coercivity Hm of the memory layer, the memory layer is a rare earth-transition metal alloy ferromagnetic film dominant in transition metal magnetic moment at room temperature, the reference layer is a rare earth-transition metal alloy ferromagnetic film dominant in rare earth metal magnetic moment at room temperature, the method comprising:
   (a) a recording step of forming, in the memory layer, bubble magnetic domains representing the data whose magnetization directions are in a first direction and whose radii are larger than a predetermined minimum stable domain radius by simultaneously applying a recording laser beam whose intensity is modulated according to the data and a recording magnetic field to the perpendicular magnetized film in the first direction;

(b) a first initializing step of, after the recording step, applying an initializing magnetic field to the perpendicular magnetized film in the first direction, the first initializing magnetic field having an intensity larger than the apparent coercivity Hr of the reference layer and smaller than the apparent coercivity Hm of the memory layer;

(c) a correcting step of, after the first initializing step, applying a correcting magnetic field to the perpendicular magnetic film in a second direction opposite to the first direction, the correcting magnetic field having a predetermined intensity Hs than the apparent coercivity Hr of the reference layer, satisfying the equation:

$$R < \sigma B \times h1 / (-\sigma w + 2Ms \times h1 \times (Hm - Hs))$$

where R is the predetermined minimum stable domain radius $\sigma$B is a side domain wall energy density of the bubble magnetic domains, $\sigma$w is an interface domain wall energy density of the bubble magnetic domains, h1 is the thickness of the memory layer, and Ms is a saturation magnetization of the memory layer; and (d) a second initializing step of, after the correcting step, applying an initializing magnetic field to the perpendicular magnetized film in the first direction, the initializing magnetic field having a predetermined intensity Hi larger than the apparent coercivity Hr of the reference layer and smaller than the apparent coercivity Hm of the memory layer.

17. A magneto-optical method of recording data in a direct overwrite manner to a perpendicular magnetized film including a memory layer and a reference layer mutually exchange-coupled, the reference layer having an apparent coercivity Hr smaller than an apparent coercivity Hm of the memory layer, the memory layer is a rare earth-transition metal alloy ferromagnetic film dominant in transition metal magnetic moment at room temperature, the reference layer is a rare earth-transition metal alloy ferromagnetic film dominant in rare earth metal magnetic moment at room temperature, the method comprising:

(a) a recording step of forming, in the memory layer, bubble magnetic domains representing the data whose magnetization directions are in a first direction and whose radii are larger than a predetermined minimum stable domain radius by simultaneously applying a recording laser beam whose intensity is modulated according to the data and a recording magnetic field to the perpendicular magnetized film in the first direction;

(b) a correcting step of, after the recording step, applying a correcting magnetic field to the perpendicular magnetic film in a second direction oppose to the first direction, the correcting magnetic field having a predetermined intensity Hs smaller than the apparent coercivity Hr of the reference layer, satisfying the equation:

$$R < \sigma B \times h1 / \{-\sigma w + 2Ms \times h1 \times (Hm - Hs)\}$$

where R is the predetermined minimum stable domain radius, $\sigma$B is a side domain wall energy density of the bubble magnetic domains, $\sigma$w is an interface domain wall energy density of the bubble magnetic domains, h1 is the thickness of the memory layer, and Ms is a saturation magnetization of the memory layer; and (c) an initializing step of, after the correcting step, applying an initializing magnetic field to the perpendicular magnetized film in the first direction, the initializing magnetic field having a predetermined intensity Hi larger than the apparent coercivity Hr of the reference layer and smaller than the apparent coercivity Hm of the memory layer.

18. A magneto-optical apparatus for recording data in a direct overwrite manner to a perpendicular magnetized film, as a recording medium, including a memory layer and a reference layer mutually exchange-coupled, the reference layer having an apparent coercivity Hr smaller than an apparent coercivity Hm of the memory layer, the memory layer is a rare earth-transition metal alloy ferromagnetic film dominant in transition metal magnetic moment at room temperature, the reference layer is a rare earth-transition metal alloy ferromagnetic film dominant in rare earth metal magnetic moment at room temperature, the apparatus comprising:

(a) moving means for moving the recording medium along a course;

(b) recording means disposed at a predetermined position along said course of the recording medium for applying a recording laser beam whose intensity is modulated according to data to be recorded and a recording magnetic field to the recording film in a first direction so as to form, in the memory layer, bubble magnetic domains representing the data whose magnetization directions are in the first direction and whose radii are larger than a predetermined minimum stable domain radius;

(c) a first initializing means for disposed downstream of the recording means along said course of the recording medium for applying an initializing magnetic field to the recording medium for applying an initializing magnetic field to the recording medium in the first direction, the initializing magnetic field having a predetermined intensity Hi larger than the apparent coercivity Hr of the reference layer and smaller than the apparent coercivity Hm of the memory layer;

(d) correcting means disposed downstream of the first initializing means along said course of the recording medium for applying a correcting magnetic field to the recording medium in a second direction opposite to the first direction, the correcting magnetic filed having a predetermined intensity Hs smaller than the apparent coercivity Hr of the reference layer, satisfying the equation:

$$R < \sigma B \times h1 / \{-\sigma w + 2Ms \times h1 \times (Hm - Hs)\}$$

where R is the predetermined minimum stable domain radius, $\sigma$B is a side domain wall energy density of the bubble magnetic domain, $\sigma$w is an interface domain wall energy density of the bubble magnetic domains, h1 is the thickness of the memory layer, and Ms is a saturation magnetization of the memory layer;

(e) a second initializing means disposed downstream of the correcting means along said course of the recording medium for applying an initializing magnetic field to the recording medium for applying an initializing magnetic field to the recording medium in the first direction, the initializing magnetic field having a predetermined intensity Hi larger than the apparent coercivity Hr of the reference layer and smaller than the apparent coercivity Hm of the memory layer; and (f) said moving means rotates the recording medium; and said recording means, said first initializing means, said correcting means and said second initializing means are disposed along an arcuate moving course of said recording medium at four different angular positions respectively.

19. A magneto-optical apparatus for recording data in a direct overwrite manner to perpendicular magnetized film, as a recording medium, including a memory layer and a reference layer mutually exchange-coupled, the reference layer having an apparent coercivity Hr smaller than an apparent coercivity Hm of the memory layer, the memory layer is a rare earth-transition metal alloy ferromagnetic film dominant in transition metal magnetic movement at room temperature, the reference layer is a rate earth-transition metal alloy ferromagnetic film dominant in rare earth metal magnetic movement at room temperature, the apparatus comprising:

(a) moving means for moving the recording medium along a course;

(b) recording means disposed at a predetermined position along said course of the recording medium for applying a recording laser beam whose intensity is modulated according to data to be recorded and a recording magnetic field to the recording film in a first direction so as to form, in the memory layer, bubble magnetic domains representing the data whose magnetization directions are in the first direction and whose radii are larger than a predetermined minimum stable domain radius;

(c) correcting means disposed downstream of the recording means along said course of the recording medium for applying a correcting magnetic field to the recording medium in a second direction opposite to the first direction, the correcting magnetic field having a predetermined intensity Hs smaller than the apparent coercivity Hr of the reference layer, satisfying the equation:

$$R < \sigma B \times h1 / \{-\sigma w + 2Ms \times h1 \times (Hm - Hs)\}$$

where R is the predetermined minimum stable domain radius, $\sigma B$ is a side domain wall energy density of the bubble magnetic domains, $\sigma w$ is an interface domain wall energy density of the bubble magnetic domains, h1 is the thickness of the memory layer, and Ms is a saturation magnetization of the memory layer;

(d) initializing means disposed downstream of the correcting means along said course of the recording medium for applying an initializing magnetic field to the recording medium for applying an initializing magnetic field to the recording medium in the first direction, the initialing magnetic field having a predetermined intensity Hi larger than the apparent coercivity Hr of the reference layer and smaller than the apparent coercivity Hm of the memory layer; and (e) said moving means rotates the recording medium; and said recording means, said correcting means and said initializing means are disposed along an arcuate moving course of said recording medium at three different angular positions respectively.

* * * * *